(12) United States Patent
Derhak et al.

(10) Patent No.: US 8,047,626 B1
(45) Date of Patent: Nov. 1, 2011

(54) AREA BASED CALCULATION OF INK USAGE

(75) Inventors: Maxim Wasyl Derhak, West Jordan, UT (US); Matthew R. Despain, Sandy, UT (US); Dean Andrew Derhak, West Jordan, UT (US); Rohit A. Patil, Salt Lake City, UT (US)

(73) Assignee: Onyx Graphics, Inc., Midvale, UT (US)

( * ) Notice: Subject to any disclaimer, the term of this patent is extended or adjusted under 35 U.S.C. 154(b) by 157 days.

(21) Appl. No.: 12/269,692

(22) Filed: Nov. 12, 2008

(51) Int. Cl.
*B41J 29/393* (2006.01)
(52) U.S. Cl. ........ 347/19; 705/400; 358/1.12; 358/1.13; 358/1.15
(58) Field of Classification Search .................. 705/400; 347/19
See application file for complete search history.

(56) References Cited

U.S. PATENT DOCUMENTS

| 7,103,581 | B1* | 9/2006 | Suen et al. ..................... 705/400 |
| 7,327,479 | B2* | 2/2008 | Matsugi ........................ 358/1.14 |
| 2002/0054324 | A1* | 5/2002 | Okada et al. .................. 358/1.15 |
| 2002/0165833 | A1* | 11/2002 | Minowa et al. ............... 705/400 |
| 2002/0191039 | A1 | 12/2002 | Minowa et al. |
| 2003/0020951 | A1 | 1/2003 | Minowa et al. |

FOREIGN PATENT DOCUMENTS

KR 10-2007-0103595 10/2007

* cited by examiner

*Primary Examiner* — Matthew Luu
*Assistant Examiner* — Brian Goldberg
(74) *Attorney, Agent, or Firm* — Workman Nydegger

(57) ABSTRACT

Estimating the cost of ink in print jobs. The cost of ink in a print job is estimated based on printed area. After determining an ink coverage value for the print jobs and determining a cost of the ink, an ink cost factor is generated over time from the cost of the ink and from the total area ink coverage. The ink cost factor is used to estimate the cost of a print job based on area.

12 Claims, 5 Drawing Sheets

AREA BASED CALCULATION OF INK USAGE

CROSS-REFERENCE TO RELATED APPLICATIONS

Not Applicable

BACKGROUND

Background and Relevant Art

In the printing industry, there are many factors that contribute to the overall cost of a print job. The ability of an individual to accurately estimate or anticipate these costs can have a significant impact on the profitability of the print job. When a print job is requested, the cost of the print job is typically estimated when preparing the bid.

The primary factors that contribute to the cost of a print job and that are taken into account when bidding the print job are the media and the ink. The amount of media used in a given print job can be estimated because much of the information about the media can be accurately determined before the printing job is performed. The dimensions of the print job, for example, identify the amount of media that will be required for the print job. As a result, the process of bidding the print job can easily take the cost of the media into account when generating a bid.

In fact, estimating a print job based on printed area is a common practice in part because it the media can be easily considered in terms of area. The ability to account for the cost of the ink, on the other hand, is more problematic. In fact, the cost of the ink is often assumed to be a fixed cost for several reasons. First, the ability to measure the volume of the ink used in the print job is difficult in part because of volume of an ink drop is often unknown and because it is possible that the volume of ink in an ink drop may change. Further, interfacing with the printing system is also difficult and is not configured to provide this type of information.

In general, obtaining an accurate estimation of the ink used in a print job requires the exact quantity of ink used per pixel (e.g., drop sizes). As previously state, this information is typically unavailable and may not be reliable. As a result, the drop size is often estimated. An incorrect estimation of the drop size, however, leads to an incorrect estimation of the ink used.

Because of the difficulty is accurately estimating the volume of the ink used by a printer for any given print job, print jobs are typically priced based on the printed area and the cost of the ink is assumed to be a fixed portion of the overall cost of the print job. The inability to accurately gauge or estimate actual ink usage can negatively impact the ability to bid on a print job.

For example, treating the cost of the ink as fixed may lead to instances where a bid for a particular print job is either too low or too high. If the cost of the ink is underestimated, then the printing entity is likely to lose at least some profit. On the other hand, overestimating the cost of the ink leaves open the possibility that a bid is more likely to be unsuccessful and also result in lost profits.

BRIEF SUMMARY

Embodiments of the invention relate to determining or estimating costs in printing systems. More particularly, embodiments of the invention relate to systems and methods for estimating the cost of at least the ink in previous print jobs as well as new print jobs. Embodiments of the invention determine the cost of the ink used in print jobs over time using the total area printed and the cost of the ink used to print that area. This effectively removes the need to know or estimate the volume of the ink drops because the cost is estimated based, in one example, on printed area and cost.

Generally, estimating the cost of the ink begins by determining the ink coverage for a particular print job. The ink coverage can be determined, in one embodiment, by the ratio between the dots actually printed in a print job and the total number of dots that could be printed in the print job assuming one hundred percent coverage. This ink coverage value can be expressed, in certain embodiments, as a percentage or as a decimal and is typically determined once the halftone data has been generated for the print job.

The ink coverage values for print jobs are typically stored in a database, along with other information such as printer identification, media type, client, and the like. When this information has been collected over a period of time, the database can then be used to estimate the cost of a print job on at least a per printer basis. The cost estimate can be generated from the historical ink coverage values and the cost of the ink.

In one embodiment, the ink coverage values are collected by a server for some period of time. The cost of the ink is also recorded by the server. This period of time should be sufficient to provide enough historical data to generate an accurate estimate of the cost of the ink. When this period is expired, the total cost of the ink is then determined. With the total cost of the ink and the ink coverage values, the cost of the ink can then be expressed as cost per area (e.g., cost per sq. ft.). This allows the subscriber to generate an estimate of the cost of the ink on the same basis that the cost of the media is determined. Advantageously, this improves the ability of the subscriber to prepare bids for print jobs and accurately estimate the associated cost.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF EMBODIMENTS OF THE INVENTION

Figure 1:
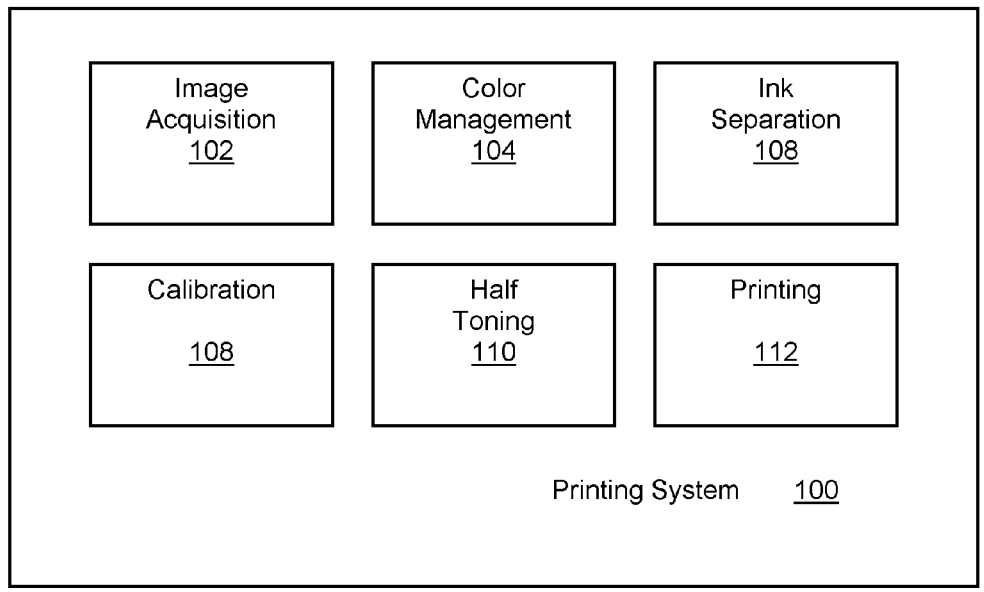
FIG. 1 illustrates one embodiment of a printing system and illustrates examples of tasks performed in a printing system to print an image on a media.

Embodiments of the invention relate generally to printing systems. More specifically, embodiments of the invention relate to estimating aspects of performing print jobs including ink usage and the cost of the ink and media of the print jobs. When the cost of a print job is estimated more accurately, the printing entity has more control over the ability to profitably perform print jobs and procure work. Embodiments of the invention can provide some of this control by enabling a printing entity to more accurately estimate the cost of ink in a given print job.

When estimating the cost of a print job, there are several factors to be considered including the cost of the media and the cost of the ink. The cost of the media can be determined rather quickly. In fact, media type and sizes are often standardized and the cost of media can be readily obtained. Even in instances where the print job may not use standardized media, the size of the print job can be quickly determined and the corresponding cost can be ascertained.

The cost of the ink can be estimated using an area based calculation. This advantageously reduces the impact of relying strictly on ink volume (e.g., drop size) when estimating the cost of the ink and is more in line with how print jobs are actually bid. In other words, print jobs are often bid based on printed area and embodiments of the invention provide systems and methods for an area-based estimation of ink usage.

Embodiments of the invention not only simplify the relationship between print jobs and ink usage, but are also quite accurate because the actual ink volume is no longer explicitly required explicitly to accurately estimate the cost of the ink. More specifically, the need to know or estimate the volume of an ink drop is eliminated.

In any print job, there are typically a variety of processes that are performed before an image is printed. These processes are related to image acquisition, image color, image resolution, and the like. One of the last processes performed before printing is halftoning. Halftoning an image essentially converts a continuous color image or other image data into a data that can be rendered by a printer. Simply stated, halftoning converts an image to a group of dots that can be printed. One of skill in the art can understand the process of halftoning an image.

The halftone data generated before an image is printed is then used to determine an area-based measurement of ink usage. This measurement reflects ink coverage in terms of the area that is actually printed as it relates to the total area that could be printed. In other words, the ink coverage value relates dots of pixels that are actually printed to dots or pixels that could be printed.

This information about ink coverage is then stored for each print job. Over time, this information, in conjunction with other information provided by a client, can be used to estimate the cost of ink for a print job based on the printed area. The estimation can be applied to specific inks, to the job as a whole, and can be applied to various print modes and resolutions. In addition, this information can also be used to identify the ink cost of previous print jobs.

Embodiments of the invention relate to an area-based method of estimating the cost of ink or of estimating ink usage in a print job. One aspect of embodiments of the invention relates to calculating ink use in terms of area printed and another aspect relates to calculating the cost of ink over time using total area printed and cost of ink used to print that area. This information can result in an ink cost factor that is then used to estimate the ink cost in new print jobs.

Calculating Ink Use in Terms of Area Printed

FIG. 1 illustrates an example of a printing system 100. In many printing systems, such as the printing system 100, the process of printing or of preparing to print often begins with image acquisition 102, although the image may already be acquired in some instances. An image can be acquired, by way of example only, by receiving an image into the printing system. An image, for example, can be scanned, imported, downloaded from an image capture device such as a camera or created using a variety of different processes and/or software programs. The computer generation of an image or the alteration of an existing image is another example of image acquisition.

After an image has been acquired, the printing system 100 may perform several other tasks in preparation for printing 112 the image. Color management 104, ink separation 106, calibration 108, and halftoning 110 are examples of tasks that may be performed for any given image. Some of these tasks are performed automatically and may be implemented, for instance, by way of printer settings. These settings can be manipulated or changed by a user as needed. In some instances, these settings automatically adapt based, for example, on the source of the image. For example, the identity of a device (such as type of camera) may impact how the color is managed. Also, these tasks can be performed in different orders in some embodiments.

Color management 104 and calibration 108 may include the conversion that occurs between color spaces. For example, the color space of a digital camera or other image capture device is often converted to the color space of another device, such as a particular printer. For example, a digital camera may capture an image using the RGB (Red, Green, Blue) color space. A printer often uses CYMK (Cyan, Yellow, Magenta, Black) inks. As a result, the image data from the digital camera or other device is converted from the RGB space to the CYMK space. One of skill in the art can appreciate that color management 104 and/or calibration 108 may include the use of color profiles, gamut mapping and the like, in order to properly prepare the image data as it relates at least to color. These tasks are often performed to ensure that the image, when printed, looks like the acquired image.

Ink separation 106 may refer to the process of separating the acquired image into various components and may be part of the halftoning process. For example, many printers use CYMK inks to print an image. Ink separation 106 separates the image into an image for each ink. An image is thus essentially divided into a C (cyan) image, a Y (yellow) image, an M (magenta) image, and a K (black) image. One of skill in the art can appreciate that some printers include different inks. For example, fluorescent inks may be used or a printing system may include dark and light versions of an ink. For example, some printing systems may use CcMmYK inks.

After these tasks have been performed, the separated images are halftoned 110. Half toning 110 is a process of representing a continuous tone image (or other image that may not be continuous) as dots, which can vary at least in terms of size, spacing, and/or placement. Once an image has been halftoned, it can then be printed 112. Typically, each dot corresponds to a drop of ink, although one of skill in the art can appreciate that the relationship between the halftone dots and drops of ink can vary. For ease of explanation, it is assumed that each dot in a halftone image corresponds to a drop of ink.

Once the image is halftoned, it can be printed 112. Using the various halftone images, the corresponding inks are then placed by the printer on the media.

Figure 2:
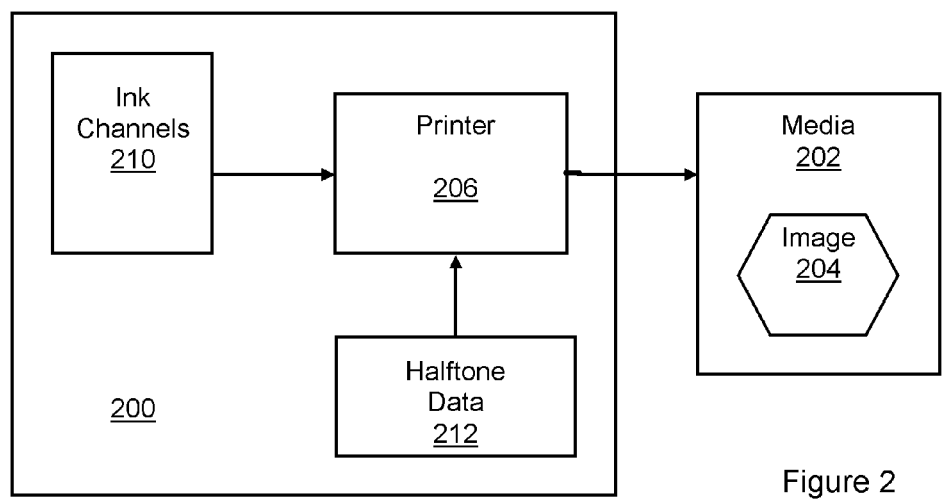
FIG. 2 illustrates another embodiment of a printing system that includes multiple ink channels.

FIG. 2 illustrates another example of a printing system 200, which is one embodiment of the printing system 100. In this example, halftone data 212 of an image has been generated and the printing system 200 is prepared to generate or print the image 204 on the media 202. The halftone data 212 may include multiple halftone images, at least one for each ink channel or color in the printing system 200.

The ink channels 210, in this example, include the various colors of ink that are used in the printer 206. Examples of ink channels include, but are not limited to, CMYK, CMY, CcMmYK, and the like. The halftone data 212 is used by the printer 206 to deposit ink onto the media 202 to form the image 204. As previously indicated, the ink from each ink channel may be deposited onto the media according to different halftone data 212. In other words, cyan ink is deposited on the media 202 in accordance with cyan halftone data, magenta ink is deposited in accordance with the magenta halftone data, etc.

At the point of printing or after the halftone data is generated, the location and type of every drop that will be printed for each ink channel is known or determined. The total volume of ink used for an ink channel can then be calculated using the sum of all of the estimated sizes for each drop that will be printed. In addition, an estimated total possible volume for an ink channel can be calculated by multiplying the total number of possible drops by the maximum possible drop type size. The ink coverage for an ink channel can then be calculated by dividing the total volume of ink used by the total possible ink volume. Although this example uses an estimate of the ink volume, the resulting ink coverage value is not expressed in terms of volume. As a result, any errors in the estimation of the drop size are reduced if not eliminated.

In certain embodiments, the total possible ink volume may depend on several factors. For example, different print modes may have different resolutions or different maximum drop volumes. As a result, the total possible ink volume may differ for the various print modes. In some instances, the ink coverage can be scaled by multiplying by the total possible ink volume for the actual print mode and dividing by the possible ink volume of all print modes for the same area that is printed.

Figure 3:
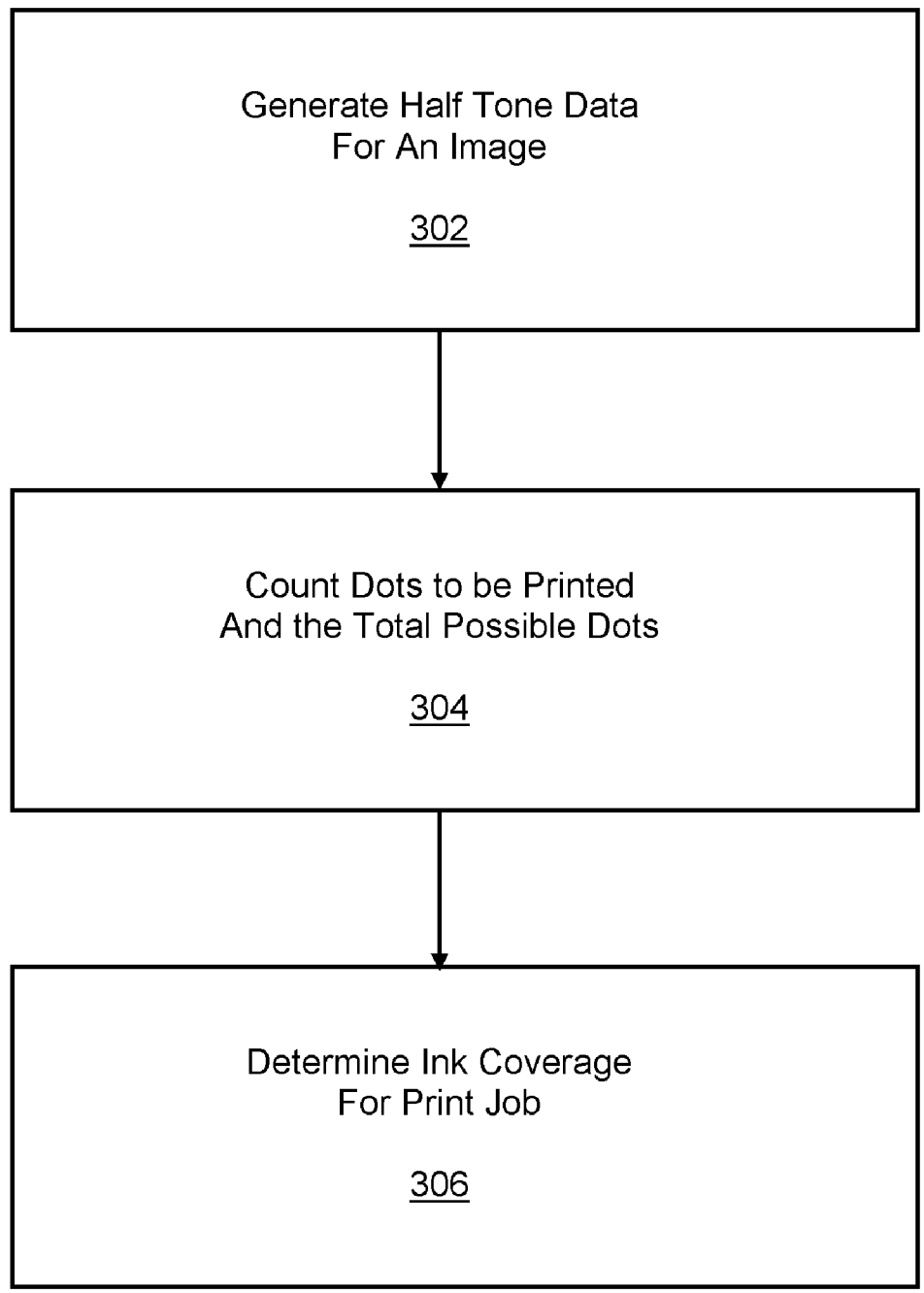
FIG. 3 illustrates one embodiment of a method for finding ink coverage in a printing system.

FIG. 3 illustrates one embodiment of a method for determining ink coverage or for calculating ink use in terms of area printed. This embodiment begins by generating 302 halftone data for an image to be printed. As previously described, an image is typically processed to generate halftone data. This may include separating the image into distinct images (that correspond to the ink channels of a printing system in one example) and then generating halftone data for each halftone image.

After the halftone data is generated for each halftone image, the number of pixels to be printed is determined 304.

In one embodiment, a pixel may correspond to a dot or droplet of ink, although a pixel may also be used to refer to a plurality of dots or to dots from more than one ink channel.

For example, a printer that prints at 600 dpi can print 600 dots per inch. As a result, the possible number of dots (or pixels) in a square inch is 360,000 dots. For a given square inch of a particular image, the halftone data may include 100,000 dots. As a result, the ink coverage for that ink channel for that square inch can be determined 306 by dividing 100,000 by 360,000, or 27.7% coverage. This example illustrates that determining 306 the ink coverage can be determined in a similar manner for a given print job. In other words, the ink coverage can be represented as a ratio between the number of dots actually printed and the total number of potential dots in the image. This advantageously can be determined without reference to the volume of each drop. As previously described, however, the resulting percentage may be scaled based on the print mode.

With reference back to FIG. 2, the image 204 is therefore associated with a certain ink coverage value on the media 204. The ink coverage of the image 204 on the media 202 can be determined by determining the number of pixels or dots actually placed divided by the total number of possible pixels or dots that could be placed on the media 202. This results in an ink coverage value for a given print job or image.

The determination of ink coverage can be accomplished in different ways and the ink channels can be considered separately or together. For example, the total ink coverage for a print job can be calculated by taking the sum of ink coverage values for all the ink channels printed. This results in ink coverage values ranging from zero to 100 percent. Alternatively, the total ink coverage for a print job can be calculated by taking the sum of ink coverage values for all the ink channels printed. This results in ink coverage values ranging from zero to (100 * number of ink channels) percent.

The total ink coverage and total area printed can be stored for each print job and expressed in various manners, including as a percentage of area. If a particular media 202 has a certain area, then the ink coverage can be expressed as a percentage of that area.

Calculating the Cost of Ink Over Time

Figure 4:
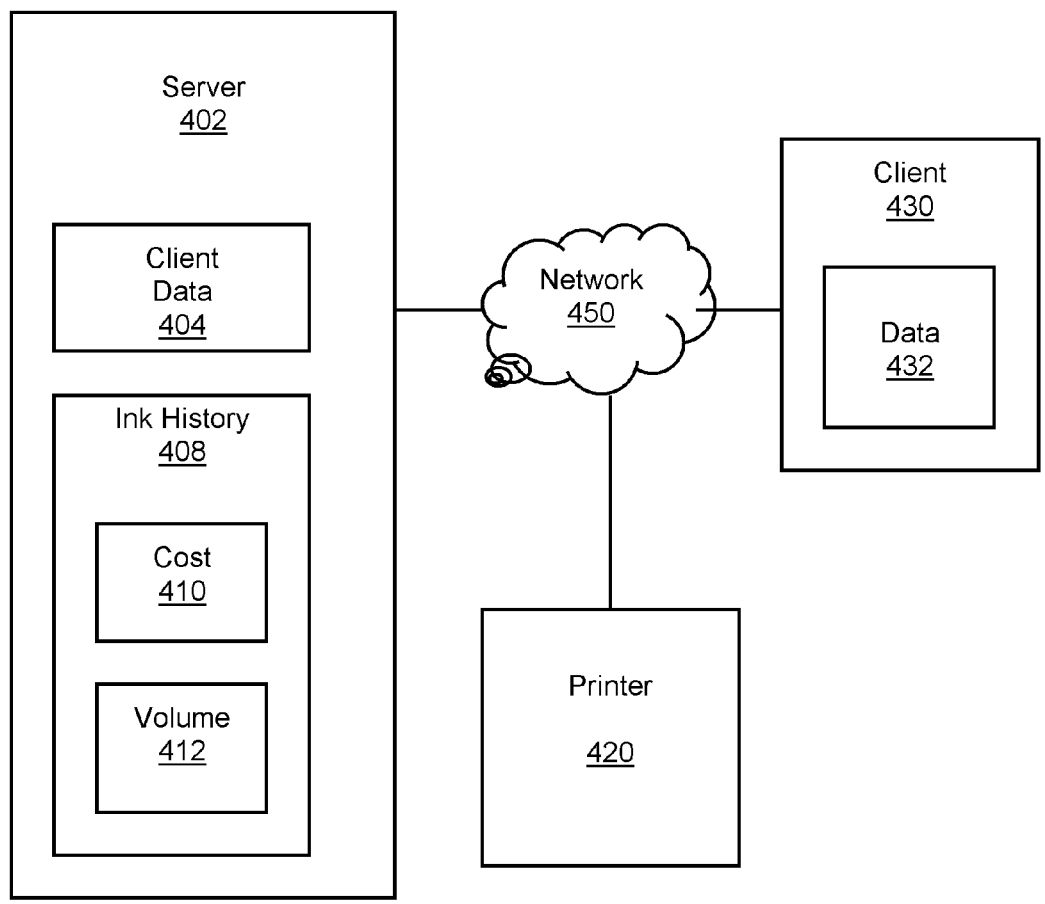
FIG. 4 illustrates one embodiment of a system that can track client data and generate an estimate of the ink cost for a print job.

As discussed above, ink coverage can be expressed in terms of a percentage of area. Over time, this information can be used to accurately estimate the cost of ink for any print job. FIG. 4 illustrates an example of a system for calculating the cost of ink over time. The system 400 can be implemented over a network such as, by way of example and not limitation, a Local Area Network, a Wide Area Network, the Internet, or any combination thereof. In addition, embodiments of the invention can be implemented on a server for use in a network or on a standalone computer.

FIG. 4 illustrates a printer 420, which is one embodiment of the printer included in the printing system 100 and/or 200. A client 430 is connected with the printer 420 over a network (or directly connected). The client 430 may include software and/or hardware necessary to perform the printing tasks described with reference to FIG. 1. In some instances, the client 430 may coordinate with the server 402 to prepare an image for printing. In some instances, the client 430 is also a server computer for the printing entity and may communicate with the server 402 as described herein.

As previously described, the client can generate data 432 that describes a print job. In this example, the data 432 includes an ink coverage determination for the print jobs performed by the printer 420. The data 432 for the print jobs is typically computed and stored for each print job, although this is not required as the estimation of the cost of the ink can be determined on less than all of the data 432. For instance, the omission of a few print jobs may have a negligible impact on the estimation of the cost of the ink over time.

The data 432 collected by the client 430 can be uploaded to the server 402 over the network 450. The server 402, for instance, may present an interface to the client 430 such as a web interface that allows the client 430 to interact with the server 402. The data 432 can be uploaded each time a print job is performed, at periodic intervals, or in batches.

When the server 402 receives the data 432, it is stored with the client data 404. The server 402 can store similar data for a plurality of different clients. Advantageously, the ability of the server 402 to estimate the cost of the ink can be determined individually for each distinct client. In some instances, the estimation of the cost of the ink can be specific to a particular printer and/or specific to particular printing modes for each client. This allows a client 430 to maintain data 432 for multiple printers.

The server 402 thus stores client data 404 that includes information for print jobs that represent ink coverage and/or media for the print jobs performed by the printer 420 or by any other printer associated with the client 430. For example, the client 430 may store, for each print job, the type of media, the area of media, and the ink coverage value. As previously stated, the ink coverage value can be for each individual inks or for all of the inks collectively, or for any other arrangement.

The client data also includes ink history data 408. The ink history 408 typically includes a cost 410 of the ink and/or a volume 412 of the ink. The ink history 410 represents, by way of example only when the ink was changed or added to the printer 420. For example, when an ink tank or cartridge is changed, the client 430 can be used to upload the cost 410 of the ink and/or the volume of the ink 412. In some embodiments, it is not necessary to store the volume of the ink 412 as the cost estimate of the ink can be generated from the ink coverage values and the cost of the ink.

In this example, the volume 412 is not specific to any particular print job, but represents the volume of an ink tank and the cost 410 represents the cost of the ink. This information may be time stamped, if desired, such that it can be correlated to the print jobs represented by the client data 404.

As the server 402 accumulates more client data 404, which includes the ink history 408, the ability of the server 402 to estimate the cost of the ink based on area improves.

Figure 5:
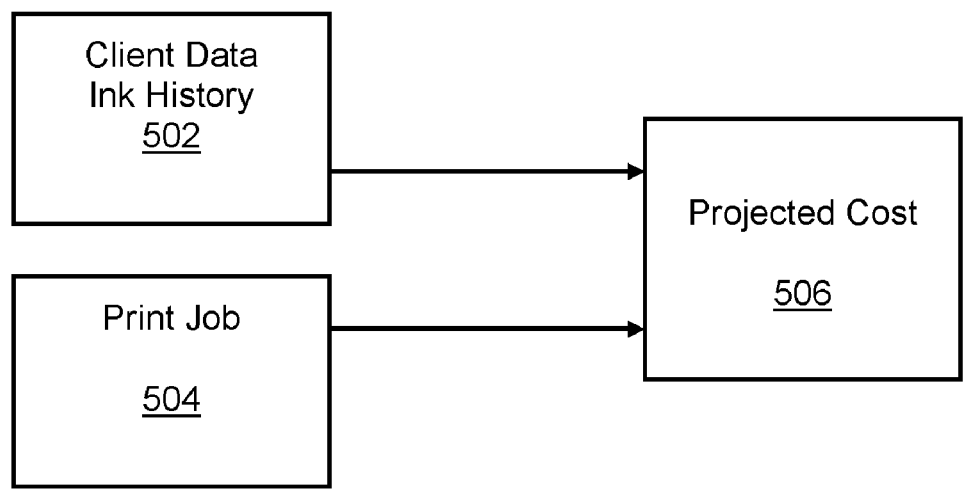
FIG. 5 illustrates an example of a method for projecting the ink cost or the total estimated cost of a print job.

FIG. 5 illustrates an example of a method for estimating the cost of the ink for a print job. The inputs include information about a print job 504 and the client data 502 (including the ink history data). With this information, a projected or estimated cost 506 of the ink for the print job 504 can be determined.

Figure 6:
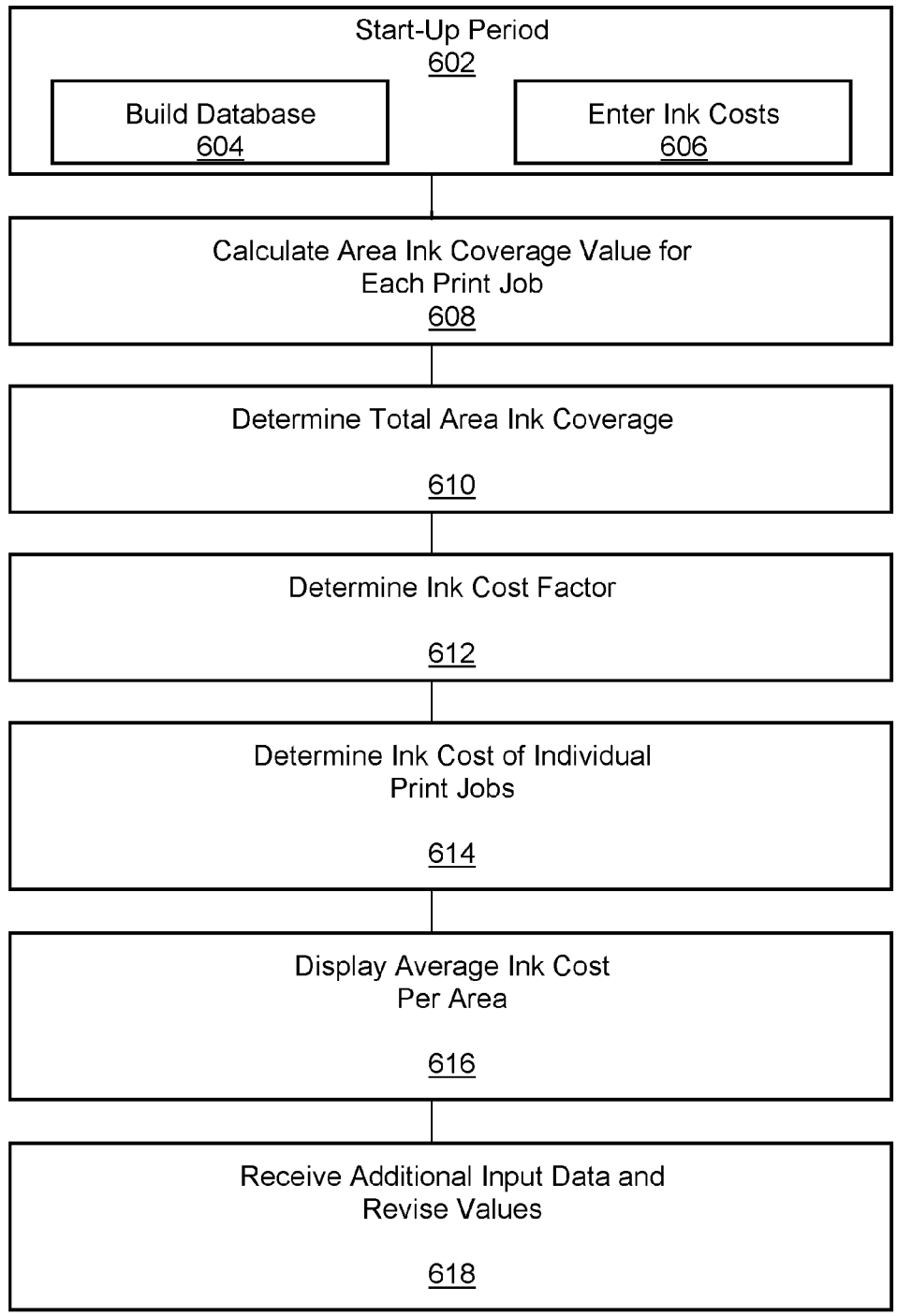
FIG. 6 illustrates one embodiment of a method for estimating the cost of ink and/or media for a print job in a printing system.

FIG. 6 illustrates a workflow of a system that uses ink coverage for determining the cost of the ink and expands on the method illustrated in FIG. 5. In one embodiment, the system for determining the cost of ink using ink coverage is provided as a service that is accessed over a network such as the Internet. A subscriber can access a web site from a server and create an account. The subscriber's server or client is typically provided with a module that operates with the subscriber's printing software to report media and ink coverage to the website. This allows the module to populate the service with all available printers and medias that are being used by the subscriber.

FIG. 6 illustrates a start up period 602 during which the subscriber begins to build a historical database 604. As described previously, the database will typically include client data, which includes ink coverage values and ink history data. The subscriber also enters ink costs 606 for each printer over the startup period. The server typically prompts the subscriber for the ink costs at the end of the start up period.

With the information that has been collected in the start up period, an area ink coverage value is determined 608 for each print job stored by the server. The area ink coverage value is determined by multiplying the area printed for the print job by the ink coverage calculated for the print job.

Next, the total area ink coverage value is determined 610 by summing the area ink coverage values for all of the print jobs that have been printed on the printer. This can be performed for each printer in a printing system and be computed specifically for each printer. As a result, the values discussed herein such as area ink coverage value and total area ink coverage value can be different for different printers.

A printer ink cost factor for the start up period can then be determined 612 by dividing the total cost of the ink during the start up period by the total area ink coverage of all print jobs performed by the printer. The ink cost factor is typically stored by the server and can be used for the purposes of job cost estimation and reporting.

The ink cost of any individual job can be determined 614, if desired, by multiplying the area ink coverage for a particular print job by the printer ink cost factor. In some instances, the ink cost factor can be scaled according to a particular print mode. Alternatively, the ink cost factor can be tracked and determined for each separate print mode. This can be achieved by storing the print mode in the client data such that when the ink cost factor is determined for a particular print mode, only data for that print mode is considered.

The server then determines and displays 616 an average ink cost per area for each printer and/or ink coverage category. Once the start up period is completed, the subscriber can then be provided with an ink cost factor, as well as other data described herein, that can be used to bid new print jobs. The ink cost factor is typically expressed in terms of area. Because many print jobs are bid based on area of the print job, accounting for the cost of the ink is greatly facilitated by an ink cost factor that is expressed in terms of area.

The server is typically configured to receive 618 additional data from the client and/or from the module installed in the printing software. For example, the server may prompt the subscriber to select an option and time period for auto prompts to enter ink and media costs. The automatic prompts can be scheduled at any interval (e.g., monthly, quarterly, weekly, etc.). For example, the server may prompt the subscriber to enter media cost from the last purchase of each media type. The subscriber is also able to enter ink cost over a specified period, per printer, without being prompted by the server.

Once this information is received, the server will calculate the new ink cost per area per printer using the costs entered by the user for the specified period and by using the printed area for the same period. The server may also average all of the calculated ink costs per area per printer over time to create an increasingly accurate historical cost per area. In some instances, this information can be used to identify costs for specific printers, specific print modes, over specific time windows, as it relates to specific job sizes, and the like or any combination thereof.

Over time, the average costs per area will become more accurate. In other words, the addition of new ink and media costs allows the server to calculate a new historical average that can be applied to new print jobs. As additional information is provided, the ink cost factor and other information generated by the server becomes more accurate. The average costs applied at the time of print can be retained and stamped to the print job for historical reporting purposes.

The following table I is used as an example to illustrate the methods described in FIG. 6.

TABLE I

| Print Job | Ink Coverage Value | Area (sq ft) | Area ink coverage value (sq ft) | Ink Cost ($) |
|---|---|---|---|---|
| 1 | 0.18 | 100 | 18 | $46.88 |
| 2 | 0.25 | 100 | 25 | $65.10 |
| 3 | 0.36 | 100 | 36 | $93.75 |
| 4 | 0.48 | 100 | 48 | $125.00 |
| 5 | 0.65 | 100 | 65 | $169.27 |
| | | Total Area Ink Coverage | 192 | |
| | | Ink Cost Factor | | $2.60 |
| Cost of Ink $500.00 | | | | |

Table I illustrates client data that has been stored by a server in a historical database for 5 different print jobs 1-5. The ink coverage value of each print job is typically determined by dividing the dots actually printed by the total possible number of dots in an image as previously described or in other manners described including by dividing the volume of the ink drops printed by the total possible volume of the ink drops that could be printed.

The area column represents the area of the corresponding print job. This information (along with media type and other information such as print mode, etc. in some embodiments) is provided to the server that provides an estimate of the ink cost.

This is an example of the type of information that may be collected during a start up period. At the end of the start up period, the subscriber may be prompted to provide the cost of the ink during the startup period, which is $500.00 in this example. One of skill in the art can appreciate that similar information can be provided for multiple printers as described herein.

The area ink coverage value is then determined at the server by multiplying the ink coverage value by the area for each print job. These values are usually computed on a print job basis and can also be stored in the historical database of client data typically maintained by the server.

Next, the total area ink coverage value for all of the print jobs is determined by summing the area ink coverage values, which is 192 sq. ft. in this example. With this information, the server can then determine the ink cost factor by dividing the cost of the ink by the total area ink coverage value. This results in an ink cost factor of $2.60.

This is the value that can be applied to future print jobs to estimate the cost of the ink. The ink cost factor value thus allows the cost of ink to be computed over time using total area printed.

In this example, an estimated cost for each print job can be determined for each of the print jobs by multiplying the ink cost factor by the area ink coverage value, as illustrated in the ink cost column.

As additional data is added to the historical database, the ink cost factor becomes more accurate. In some embodiments, the ink cost factor can also be configured to ignore data from print jobs that may have exceedingly high or low ink coverage values. This can adjust the ink cost factor to be more applicable for print jobs that have a typical ink coverage value. As previously described, the information illustrated in Table I can be determined for the ink used as a whole or for each ink channel individually.

In some instances, a conversion factor can be used to convert dots of ink usage to account for resolution or for different print modes. In other words, the ink used by a particular mode and/or resolution of a printer may differ. A conversion factor can be used to account for these differences.

A conversion factor or scaling may also be performed in instances where the drop sizes of the different ink channels are different. This would allow, for example, the ink coverage value for one ink or color to compare better to the coverage value for another ink or color.

The present invention extends to estimating the cost of ink in printing systems. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for estimating a cost of ink used to print a print job on a printer, the method comprising:
   receiving client data from a client, wherein the client data includes ink coverage values for the plurality of print jobs, media types, a cost of the ink and printed area for each of the plurality of print jobs and wherein the client data is stored in a database;
   determining an area ink coverage value for each of a plurality of print jobs performed by the printer;
   determining a total area ink coverage for the plurality of print jobs using the area ink coverage values; and
   determining an ink cost factor from the total area ink coverage and a cost of the ink for the print job.

2. The method of claim 1, wherein the client data enables the ink cost factor and the cost of the ink for the print job to be determined for a plurality of different printers, wherein the client data includes data for the plurality of different printers.

3. The method of claim 1, further comprising determining the area ink coverage values by multiplying the ink coverage values by the printed areas for each of the plurality of print jobs.

4. The method of claim 3, wherein determining a total area ink coverage further comprises summing the area ink coverage values for the plurality of print jobs.

5. The method of claim 4, wherein determining an ink cost factor further comprises dividing the cost of the ink by the total area ink coverage.

6. The method of claim 1, further comprising estimating a cost of ink for a new print job using the ink cost factor.

7. The method of claim 1, further comprising updating the client data with new client data from new print jobs.

8. The method of claim 7, further comprising updating the ink cost factor by accounting for the new client data.

9. The method of claim 7, wherein the ink cost factor is displayed for at least one of:
   a printer of a subscriber;
   each ink channel of the printer;
   each print mode of the printer; and
   each printer of the subscriber.

10. The method of claim 1, further comprising automatically prompting a subscriber to update the client data.

11. The method of claim 1, further comprising performing a start-up period during which client data is received, wherein an initial ink cost factor is generated at an end of the start-up period.

12. The method of claim 1, wherein the area ink coverage value for each of the plurality of print jobs is determined using at least one of:
   halftone data to identify a number of dots to be printed as it relates to total possible number of dots that could be printed; or
   estimated volume of each dot to be printed as it relates to total possible volume of dots that could be printed.

* * * * *